Oct. 24, 1933.  W. C. STARKEY  1,932,000
CLUTCH SPRING
Original Filed Jan. 7, 1931
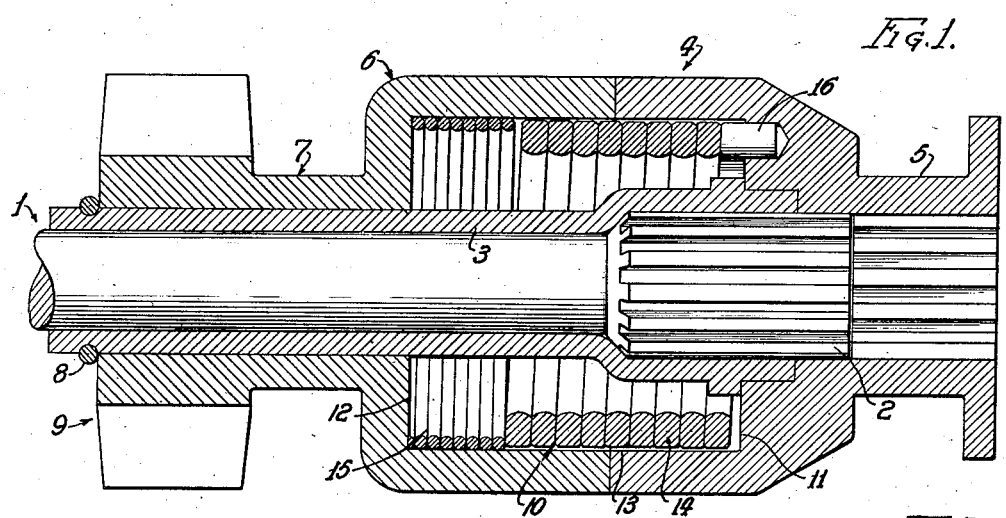
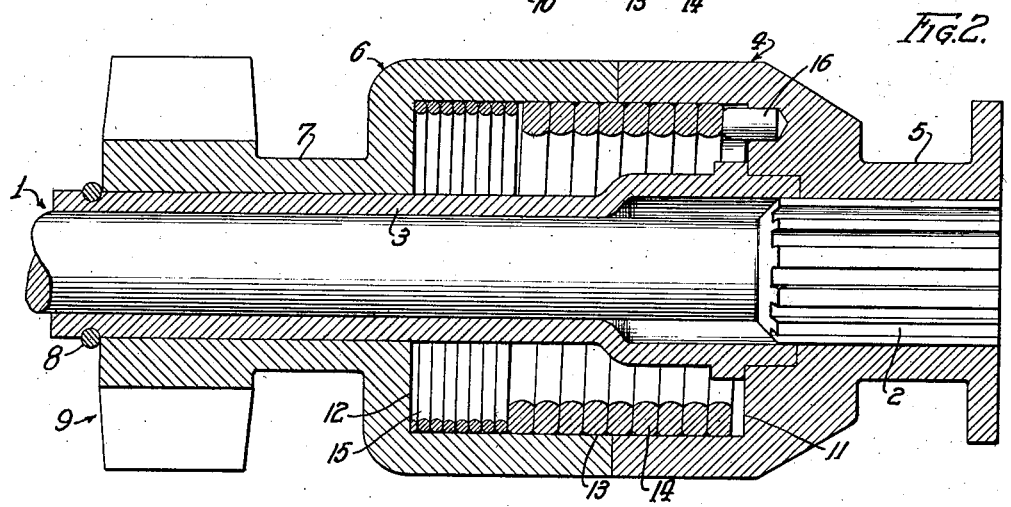
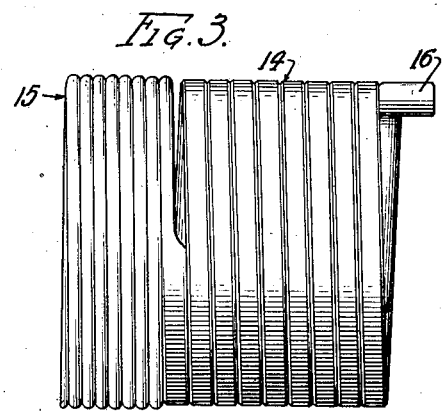
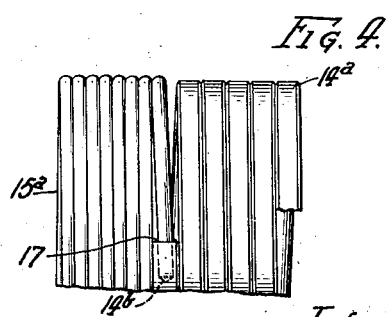
Inventor:
William C. Starkey
By: Arthur M. Nelson
Atty.

Patented Oct. 24, 1933

1,932,000

UNITED STATES PATENT OFFICE 1,932,000

CLUTCH SPRING

William C. Starkey, Indianapolis, Ind., assignor to L. G. S. Devices Corporation, Indianapolis, Ind., a corporation of Indiana Original application January 7, 1931, Serial No. 507,060. Divided and this application November 25, 1931. Serial No. 577,240

8 Claims. (Cl. 192—107)

The present application is a divisional application, as the subject matter herein was first presented in my copending application for patent on Spring clutches, filed January 7, 1931 under Serial No. 507,060.

This invention relates to improvements in clutch springs and it consists of the matters hereinafter described and more particularly pointed out in the appended claims.

A clutch of the kind with which my improved spring structure is particularly concerned, embodies two coaxial clutch members providing a recess for the spring to permit a comparatively free relative rotation between said clutch members in one direction but to radially expand or be radially expanded into engagement with an annular wall of said recess upon a relative rotation between said cup members in the other direction to clutch said members together.

The primary object of the invention is to provide a clutch spring for use in a clutch of this kind, having lighter overrunning characteristics, is subject to less wear and has greater sensitivity and at the same time remains unaffected so far as this sensitivity is concerned under unfavorable conditions in the associated recess such as the congealing or stiffening of the lubricant in said recess at low temperatures.

These objects of the invention as well as others, together with the many advantages thereof will more fully appear as I proceed with my specification.

In the drawing:—

Fig. 1 is a longitudinal vertical sectional view through a spring clutch embodying my improved clutch spring with the parts in a position wherein one clutch member may overrun the other clutch member.

Fig. 2 is a view similar to Fig. 1 showing the relative position of the parts as when the improved clutching spring has radially expanded upon a relative rotation of the clutch members to clutch them together.

Fig. 3 is a view in side elevation of one type of my improved clutch spring which may be advantageously used in a spring clutch.

Fig. 4 is a view in side elevation of a modified form of clutch spring embodying my invention.

The invention is herein illustrated and described as embodied in the pinion unit spring clutch of an engine starter but as will be apparent it may also be embodied in other mechanisms when the peculiar advantages of the invention make it desirable to do so.

Referring now in detail to that embodiment of the invention illustrated in the accompanying drawing:—1 indicates as a whole the driven shaft of an automobile or like engine starting motor, having a splined part 2 of enlarged diameter at that end remote from said motor. On said shaft is mounted a bearing sleeve or bushing 3. A cup-shaped clutch member 4 is provided at one end with a hub 5 having a splined connection with the splined part 2 of the shaft 1. A second clutch member 6 has a hub 7 at one end that is journalled on the sleeve 3 and is held against an endwise movement in one direction thereon by a spring retaining ring 8 suitably engaged in an annular groove in said sleeve. On said hub is formed the pinion 9 which in an endwise movement of both cup-shaped members toward the starting motor is adapted to be moved into engagement with the fly wheel ring gear (not shown) of the engine to be started.

Both cup-shaped members are formed at their abutting ends to provide a clutch spring recess 10 having flat ends 11 and 12 respectively and an annular clutch surface 13.

In said recess is located a clutch spring embodying my invention and which comprises a main clutch spring 14 with a secondary or energizing spring 15 at one end thereof. Preferably the main clutch spring when in its normal unstressed condition is of a diameter slightly less than that of the recess so as to have a clearance with respect thereto as best shown in Fig. 1. Said spring is made of relatively heavy stock and one end thereof is bent to form a toe 16 engaged in a pocket in the end wall 11 of the clutch recess 10. Each turn of this main clutch spring has flat sides thus permitting the use of an increased number of turns in said spring for a recess of the desired length.

The secondary or energizing spring 15 which is preferably of an axial length less than that of the main clutch spring, is normally of a slightly larger diameter than said main clutch spring and is made of spring stock of a cross sectional area less than that of the main clutch spring and is therefore more sensitive or resilient in its action. The diameter of said secondary spring approximates that of the clutch surface 13 of the recess so as to engage the same with a light overrunning action.

One end of said secondary spring is ground flat to engage the flat end 12 of the recess and said spring may be made as an integral part of the main clutch spring as shown in Fig. 3 or it may be made as a separate element and then secured to the main clutch spring as shown in Fig. 4.

When the secondary spring is an integral part of the main spring, then the stock from which said spring as a whole is made must be of a lesser cross section at one end than the other as is apparent. Such a length of spring stock or wire can be readily drawn and the part of larger cross section is flattened upon opposite sides before winding said length of stock into spring form. In Fig. 4 the spring is shown as made of two separate lengths of wire of different cross sectional areas and the part 14a of larger cross sectional area is provided at one end with an axial recess 14b to receive one end of the part 15a of smaller cross sectional area, secured in place by welding as at 17 or in any other suitable manner.

Assume that with the parts shown in the position, in Fig. 1, the starting motor is energized to rotate the shaft 1. By means of the splined connection between said shaft and the hub 5 of the clutch member 4 said member is rotated in the proper direction.

This rotation of said cup member will through the main clutch spring 14 act to unwind the secondary or energizing spring 15, to cause it to engage the annular surface 13 of the recess 10 and will act to hold that end of the main clutch spring to which it is connected. With said end of the main clutch spring thus held against movement and with energy imparted to the first mentioned end thereof, said spring will unwind and radially enlarge or expand from that end thereof held by the energizing spring. This unwinding will proceed progressively throughout the various turns of the main spring which grips against said surface of the recess to clutch both clutch members together.

When the clutch member 6 is rotated in the proper direction, at a speed greater than that of the clutch member 4, this will act to wind up the secondary or energizing spring 15 and reduce its diameter and impart a like action to the main spring 14 so that an overrunning is possible between the two clutch members.

By employing the relatively light energizing spring, a light overrunning action is assured because of its small dragging action and as will be apparent it is practical to make the main spring slightly undersized when in its normal condition, with respect to the associated surface of the clutch member. With the energizing spring, sensitivity of operation of the main clutch spring is assured and all turns of said main spring are caused to be equally expanded so that the clutching action is evenly distributed throughout the entire length of the main clutch spring and is therefore uniform.

Again, the use of such an energizing spring reduces the number of parts required in a clutch of this kind with a resulting reduction in manufacturing costs.

In addition to the above, another advantage of such an energizing spring is that it enables the placing of more turns of a spring in the same total axial length of pocket. The total number of turns (regardless of their size) is an all-important factor in securing the greatest amount of holding power in all such spring clutches. Again, it is often desirable to keep axial length to a minimum.

It is also pointed out that when the lubricant with which the clutch is filled, congeals and stiffens up under low temperatures, the energizing spring because of its small cross sectional diameter, i. e. because the individual turns are made narrower, easily cuts through the same so that the resistance ordinarily offered by the lubricant in this condition is readily overcome. Thus the clutch is positive and sensitive under low temperature conditions. In other words this construction gives added assurance of positive locking when used in the presence of stiff oils at low temperature.

While in describing the invention, I have referred in detail to the form, arrangement and construction of the parts thereof, the same is to be considered merely as illustrative so that I do not wish to be limited thereto except as may be specifically set forth in the appended claims.

I claim as my invention:—

1. A clutch spring embodying therein a main clutching portion comprising a plurality of spring turns and an energizing portion at one end of the main clutching portion and comprising at least substantially one spring turn directly connected to the end of one spring turn of the main clutching portion and being more resilient and of a diameter different from that of the spring turns in said main clutching portion and made of stock having a cross sectional area less than that of the turns in said main clutching portion.

2. A clutch spring embodying therein a main clutching portion comprising a plurality of spring turns and an energizing portion at one end of the main clutching portion and comprising at least one spring turn more resilient and oversize in diameter with respect to that of the spring turns in said main clutch portion said spring turn of said energizing portion being made of stock of a cross sectional area less than that of the turns in said main clutching portion.

3. A clutch spring having a part of its turns at one end of one diameter and of a predetermined cross sectional area, the turns at the other end of the spring being of a greater diameter and of a lesser cross sectional area.

4. A clutch spring embodying therein a main clutching portion comprising a plurality of spring turns of one diameter and of a predetermined resiliency and an energizing portion at one end of the main portion and comprising a plurality of spring turns oversize and more resilient than the spring turns of the main clutching portion.

5. A clutch spring embodying therein a main clutching portion comprising a plurality of spring turns, one of which is formed to provide an anchoring toe at one end of said main clutching portion and an energizing portion operatively connected to the spring turn at the other end of said main clutching portion, said energizing portion comprising a plurality of turns of a greater diameter but of a smaller and more resilient cross sectional area and being ground flat at its free end.

6. A clutch spring of the kind described embodying therein but two portions; namely, a load carrying portion and an energizing portion, both portions having surfaces adapted in use to engage a friction surface of a clutch, the working face of said energizing portion having a diameter different from that of the load carrying portion and said energizing portion also being substantially more resilient than said load carrying portion.

7. A clutch spring of the kind described embodying therein but two portions; namely, a load carrying portion and an energizing portion, both portions having surfaces adapted in use to engage a friction surface of a clutch, said energizing portion being oversize with respect to the load carrying portion and being directly connected at one end to said load carrying portion and being free at its other end.

8. A clutch spring embodying therein a load carrying portion and an energizing portion, said load carrying portion comprising a plurality of turns of a predetermined cross sectional area and having a recess in the end face of one of the endmost turns thereof, the end of the other endmost turn of the load carrying portion being formed to provide an anchoring toe, said energizing portion comprising substantially at least one turn of a diameter different than that of the load carrying portion and being more resilient than the same, one end of said energizing portion being fixed in the recess in said end face of said first mentioned endmost turn of the load carrying portion.

WILLIAM C. STARKEY.